United States Patent [19]
Babjak et al.

[11] Patent Number: 6,015,538
[45] Date of Patent: Jan. 18, 2000

[54] METHODS FOR DOPING AND COATING NICKEL HYDROXIDE

[75] Inventors: Juraj Babjak; Victor Alexander Ettel, both of Mississauga; Stephen Joseph Baksa, Oakville, all of Canada

[73] Assignee: Inco Limited, Toronto, Canada

[21] Appl. No.: 09/098,407

[22] Filed: Jun. 16, 1998

[51] Int. Cl.[7] .............................. C01B 13/36; C01G 53/04
[52] U.S. Cl. ........................ 423/592; 428/701; 423/594
[58] Field of Search .................................... 423/594, 592, 423/140; 429/223; 428/701; 427/126.3, 126.4, 126.6

[56] References Cited

U.S. PATENT DOCUMENTS

| | | | |
|---|---|---|---|
| Re. 34,752 | 10/1994 | Oshitani et al. | 429/223 |
| 4,244,938 | 1/1981 | Alkaitis | 423/592 |
| 4,844,999 | 7/1989 | Oshitani | 429/223 |
| 5,281,494 | 1/1994 | Ettel et al. | 429/223 |
| 5,366,831 | 11/1994 | Watada et al. | 429/223 |
| 5,447,707 | 9/1995 | Babjak et al. | 423/592 |
| 5,498,403 | 3/1996 | Shin | 423/592 |
| 5,545,392 | 8/1996 | Babjak et al. | 423/592 |
| 5,629,111 | 5/1997 | Yamawaki et al. | 429/223 |
| 5,660,952 | 8/1997 | Yano et al. | 429/223 |
| 5,688,616 | 11/1997 | Yamaki et al. | 429/223 |
| 5,691,086 | 11/1997 | Baba et al. | 429/218 |
| 5,700,596 | 12/1997 | Ikoma et al. | 429/206 |

OTHER PUBLICATIONS

Oshitani et al., "Development of a Pasted Nickel Electrode with High Active Material Utilization," Jun., 1989, pp. 1590–1593.

*Primary Examiner*—Steven Bos
*Attorney, Agent, or Firm*—Blake T. Biederman; Edward A. Steen

[57] ABSTRACT

The process precipitates additives onto nickel hydroxide seeds in an ammonia solution. Then introducing at least one metallic additive into the aqueous solution creates a slurry having a reducing potential. The additive is selected from the group consisting of aluminum, cadmium, cobalt, indium, iron, manganese and zinc. Introducing oxygen into the additive-containing slurry at a controlled rate maintains the reducing potential of the solution. At least one of the additives dissolves into the aqueous solution in excess of the slurry's solution solubility to precipitate the additive in the form of a hydroxide on the nickel hydroxide seeds.

18 Claims, 4 Drawing Sheets

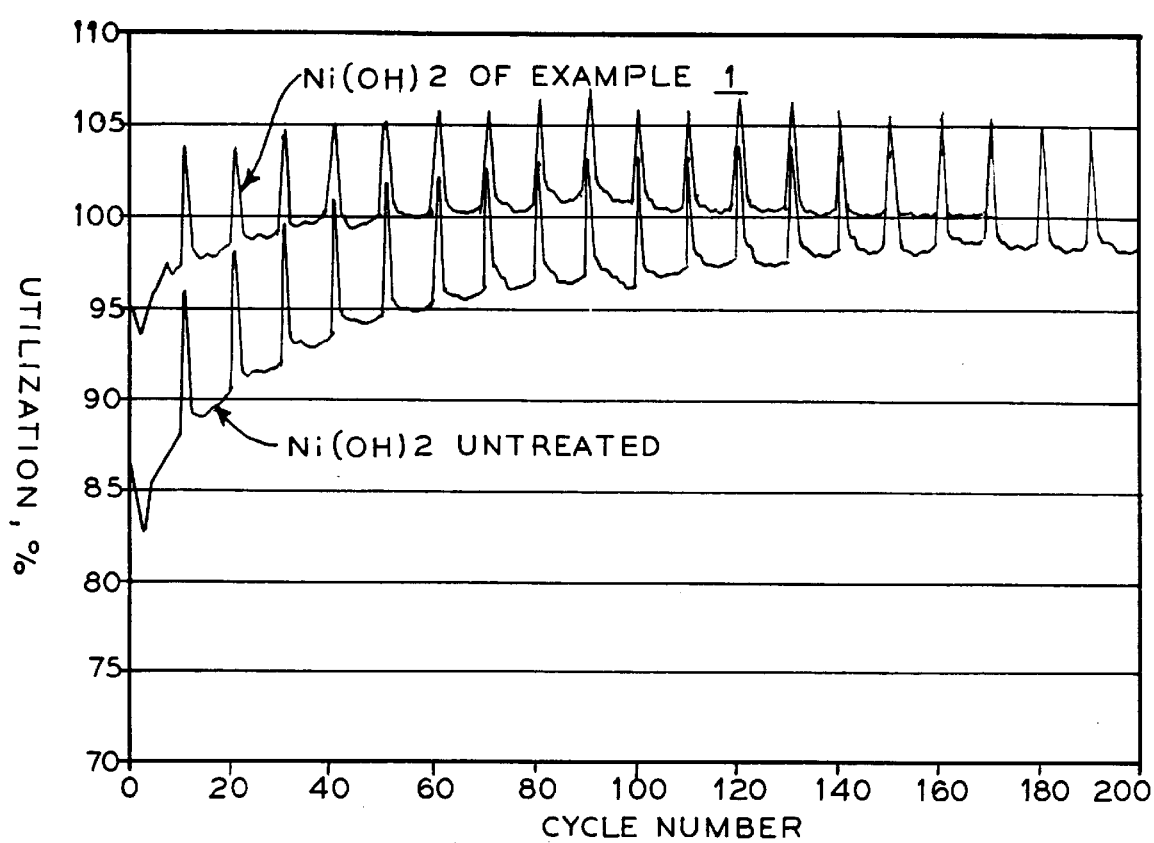

METHODS FOR DOPING AND COATING NICKEL HYDROXIDE

FIELD OF THE INVENTION

This invention relates to a method for incorporating additives into nickel hydroxide and for coating nickel hydroxide with additives. In particular, the method of the invention has the ability to co-precipitate additives into a nickel hydroxide matrix and to coat nickel hydroxide matricies with additives.

BACKGROUND OF THE INVENTION

Nickel hydroxide is an important material in the manufacture of positive nickel electrodes of alkaline batteries. Doping the electrode's nickel hydroxide with suitable additives increases the nickel hydroxide's electrochemical activity. U.S. Pat. Nos. 4,844,999, Re. 34,752 and 5,366,831, all to Yuasa Battery Company, Limited of Japan document this and other beneficial properties obtained from doping. The common features of these processes include dissolving the additives' salts in a nickel feed solution and coprecipitating the additives with nickel hydroxide using a base. Generally, these processes rely on introducing sodium hydroxide to precipitate metal from their sulfates.

Inco Limited's U.S. Pat. Nos. 5,281,494 discloses a method of dissolving metal additives and coprecipitating these to dope nickel hydroxide. This process operates with an oxidizing potential at temperatures above 180° C. These high temperature conditions yield a stable-crystalline product having diminished electrochemical performance in batteries. Similarly, U.S. Pat. No. 5,447,707, discloses a process that introduces additives directly from powder into nickel hydroxide. Unfortunately, this process introduces small quantities of nitrates into the nickel hydroxide.

The process described in the U.S. Pat. No. 5,545,392, produces nickel hydroxide with the direct conversion of elemental nickel into nickel hydroxide from a closed loop process. The introduction of additives, in the form of their salts, into the recycled feed solution or directly into a reactor is possible with this process. This process of introducing additives' salts however upsets the anion balance. Furthermore, this process requires: 1) bleeding a portion of the process liquor to restore the anion balance; and 2) subjecting this bleed stream to necessary treatments that would produce an environmentally acceptable effluent for disposal.

Oshitani et al.'s "Development of a Pasted Nickel Electrode with High Active Material Utilization" discloses battery's increased active mass utilization achieved from coating nickel hydroxide with a layer of cobalt hydroxide. In particular, the authors documented that nickel hydroxide's surface conductivity increased from 0.15 S/cm to 12.8 S/cm by coating it with cobalt oxyhydroxide. The charging cycles of nickel hydroxide-containing batteries converts CoO powder to $Co(OH)_2$ that precipitates on the nickel hydroxide. Eventually, the cobalt hydroxide oxidizes to a stable-cobalt oxyhydroxide coating during repeated charging.

It is an object of this invention to develop a method for incorporating additives into nickel hydroxide in a manner that does not over-crystallize the hydroxide or require the addition of salts to the system.

It is a further object of this invention to provide a pollution-free process for incorporating additives into nickel hydroxide.

It is a further object of the invention to develop a method for distributing additives, such as cobalt, between the nickel hydroxide's internal lattice or as a surface-rich layer that surrounds the nickel hydroxide particles.

It is a further object of this invention to provide a method for incorporating and coating cobalt-free nickel hydroxide with cobalt.

SUMMARY OF THE INVENTION

The process precipitates additives onto nickel hydroxide seeds in an ammonia solution. Then introducing at least one metallic additive into the aqueous solution creates a slurry having a reducing potential. The additive is selected from the group consisting of aluminum, cadmium, cobalt, indium, iron, manganese and zinc. Introducing oxygen into the additive-containing slurry at a controlled rate maintains the reducing potential of the solution. At least one of the additives dissolves into the aqueous solution in excess of the slurry's solution solubility to precipitate the additive in the form of a hydroxide on the nickel hydroxide seeds.

DESCRIPTION OF THE DRAWING

FIG. 2 a graph of battery charging cycles versus utilization that compares uncoated to cobalt-coated nickel hydroxide.

DESCRIPTION OF PREFERRED EMBODIMENT

The process provides an environmentally friendly method for producing additive-containing nickel hydroxides. This process dissolves a metallic additive such as aluminum, cadmium, cobalt, indium, iron, manganese and zinc into an ammonia solution. The dissolving of the additive in the presence of oxygen is carried out with the solution having a reducing or negative potential. At negative potentials, the process coprecipitates the additive's hydroxide with nickel hydroxide to produce a doped nickel hydroxide particle. Optionally, the process coats either a nickel hydroxide particle or a doped nickel hydroxide particle with an additive's hydroxide. Furthermore, this process facilitates coating with multiple additives or with nickel-diluted additives by simply adjusting the metal powders introduced into the solution.

EXAMPLES

The following examples describe specific embodiments of the invention.

Example 1

This illustrates depositing a cobalt-rich layer onto nickel hydroxide particles.

Introducing approximately 1,000 g of nickel hydroxide seed into an ammonia/ammonium acetate solution (approximately 1 mole acetate/L) pulped the nickel hydroxide. A 2 L baffled vessel agitated this slurry and maintained it at a temperature of 70° C. The vessel contained a reflux condenser, oxygen sparger, temperature controller, redox electrode and feed ports for adding powders. Introducing carbonyl nickel powder (approximately 40 g of <3 $\mu$m particles) and a fine cobalt powder (approximately 20 g of 7 $\mu$m particles) into the slurry activated the powder. When the redox-potential became negative, the oxygen sparger introduced oxygen gas into the slurry at a rate of 20 mL/minute. This initiated the conversion of the nickel and cobalt powders into their hydroxides. These hydroxides deposited on the surface of the seed nickel hydroxide particles. The reaction continued until essentially all metallic powders converted into their hydroxides, at which point the redox-potential became slightly positive. A solid/liquid separation recovered the hydroxide product from the reacted slurry.

Figure 1A:
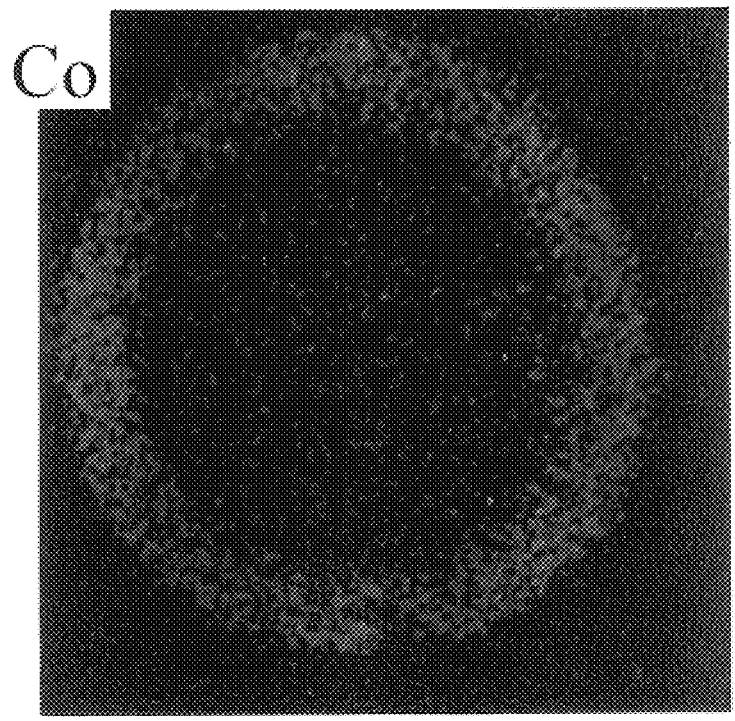
FIG. 1A is a 3000× magnification SEM photograph of a cross-section of a cobalt-coated nickel hydroxide particle illustrating cobalt distribution.
Figure 1B:
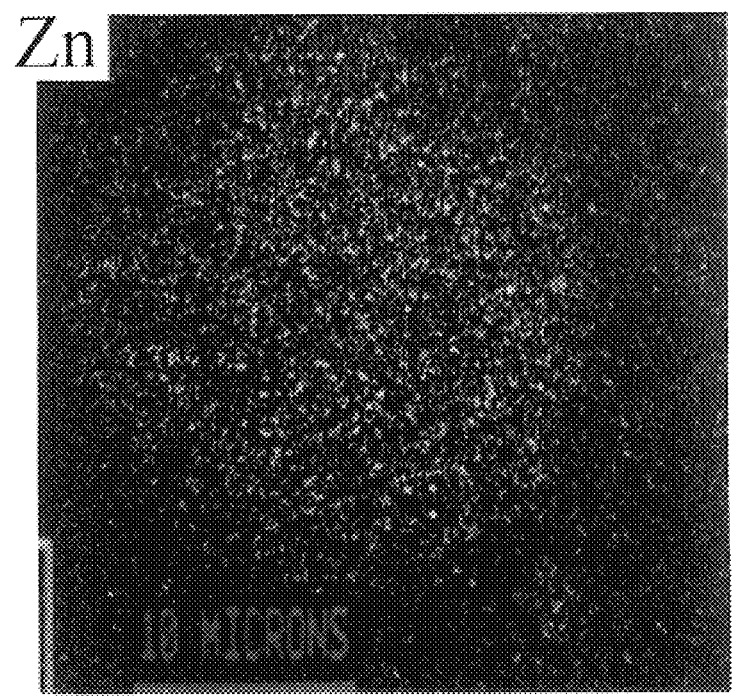
FIG. 1B is a 3000× magnification SEM photograph of a cross-section of the cobalt-coated nickel hydroxide particle of FIG. 1A illustrating zinc distribution.

Referring to FIG. 1A, the initial cobalt is uniform throughout the interior of the particle—in this case, at a relatively low concentration (corresponding to approximately 0.5%). And the cobalt added in this Example, is at a much higher concentration at the exterior surface of the particle. This mode of cobalt distribution has a very positive effect on the hydroxide's performance in battery applications.

Pasting nickel electrodes with the nickel hydroxide of this Example before and after coating prepared the material for testing. Then subjecting these electrodes to electrochemical testing in flooded cells confirmed the performance increase achieved with the cobalt-nickel hydroxide coating. Referring to FIG. 2, the cobalt-nickel coating increased both the initial and the overall utilization of the nickel hydroxide.

Example 2

Deposition of cobalt hydroxide layer onto nickel hydroxide particles.

This test is the same as Example 1, except that the slurry contained cobalt powder and nickel hydroxide reacted in the absence of nickel powder. Introducing 860 g of Ni(OH)$_2$, containing about 4% zinc and no cobalt into 1.7 L of an ammonia/ammonium acetate solution (approximately 1 mole Acetate/L) formed the slurry solution. Then adding 30 g of a fine cobalt powder to the hydroxide slurry activated the cobalt powder for dissolution. The redox-potential dropped to around –700 mV with respect to a standard Calomel electrode. After achieving this negative potential, introducing the oxygen gas into the slurry at a rate of 10 mL/minute converted the cobalt powder into cobalt hydroxide. The test operator turned off the oxygen gas when the redox-potential became slightly positive. At this point, essentially all of the cobalt powder had converted into cobalt hydroxide that deposited on the surface of the nickel hydroxide particles.

Example 3

Figure 3A:
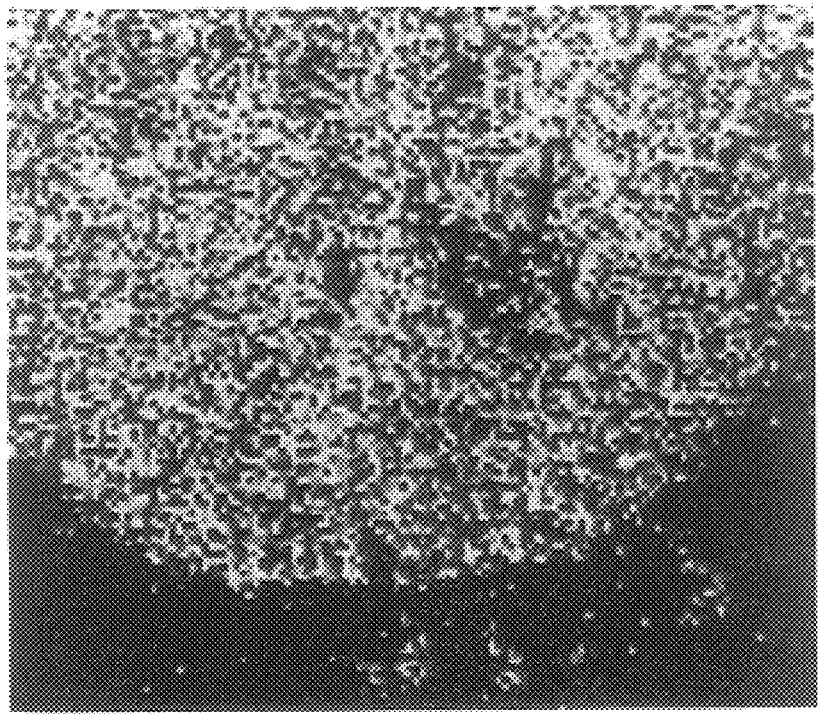
FIG. 3A is a 32000× magnification SEM photograph of a nickel hydroxide particle co-precipitated with cobalt and zinc illustrating its cobalt distribution.
Figure 3B:
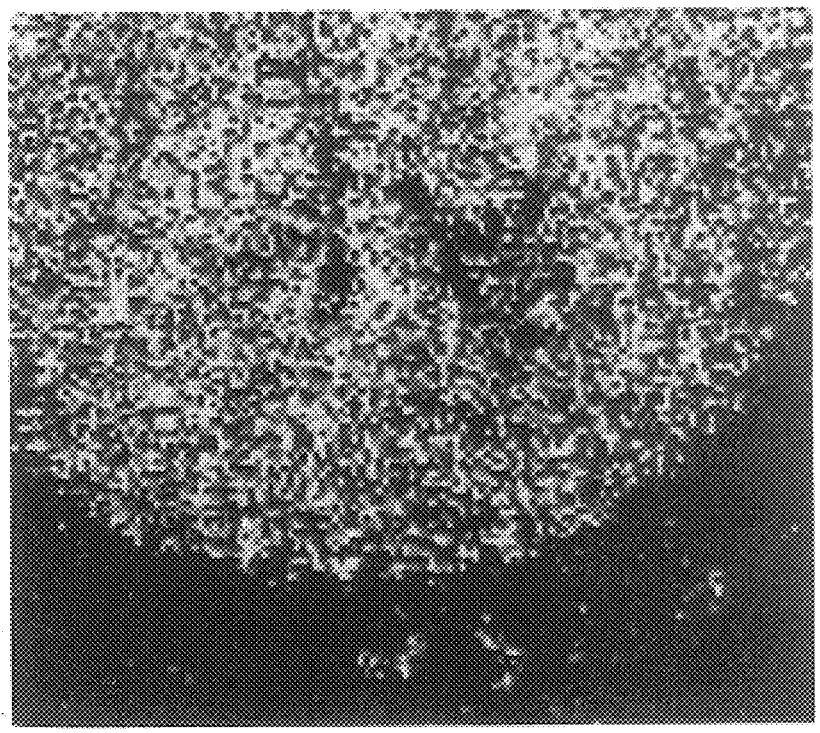
FIG. 3B is a 32000× magnification SEM photograph of the nickel hydroxide particle of FIG. 3A illustrating zinc distribution.

Cobalt and Zinc distributed uniformly in the lattice. Heating 1.7 L of an ammonia/ammonium acetate solution (approximately 1 mole acetate/L) to 70° C. in the 2 L vessel of Example 1 prepared the solution for the conversion reaction. Then approximately 600 g of a fine carbonyl nickel powder were introduced into the agitated solution and allowed to interact for about 30 minutes. The redox-potential of the slurry decreased to below –700 mV with respect to a standard Calomel electrode. Then 50 g of nickel hydroxide seeds were added to the mixture and after about 30 minutes later oxygen addition at a rate of 50 mL/minute was initiated. This initiated the conversion of Ni powder into nickel hydroxide. During the reaction aqueous slurries of fine Co and Zn powders (approximately 7 microns mean particle diameter) were continuously added into the reaction slurry; and the total addition of Co and Zn powders corresponded to approximately 30 g each. Co and Zn powders co-reacted with the nickel and incorporated uniformly into the nickel hydroxide lattice, as illustrated in the photomicrograph of FIG. 3.

Example 4

Post-Addition of cobalt into cobalt-free nickel hydroxide by sorption from a cobalt-containing solution.

Figure 4:
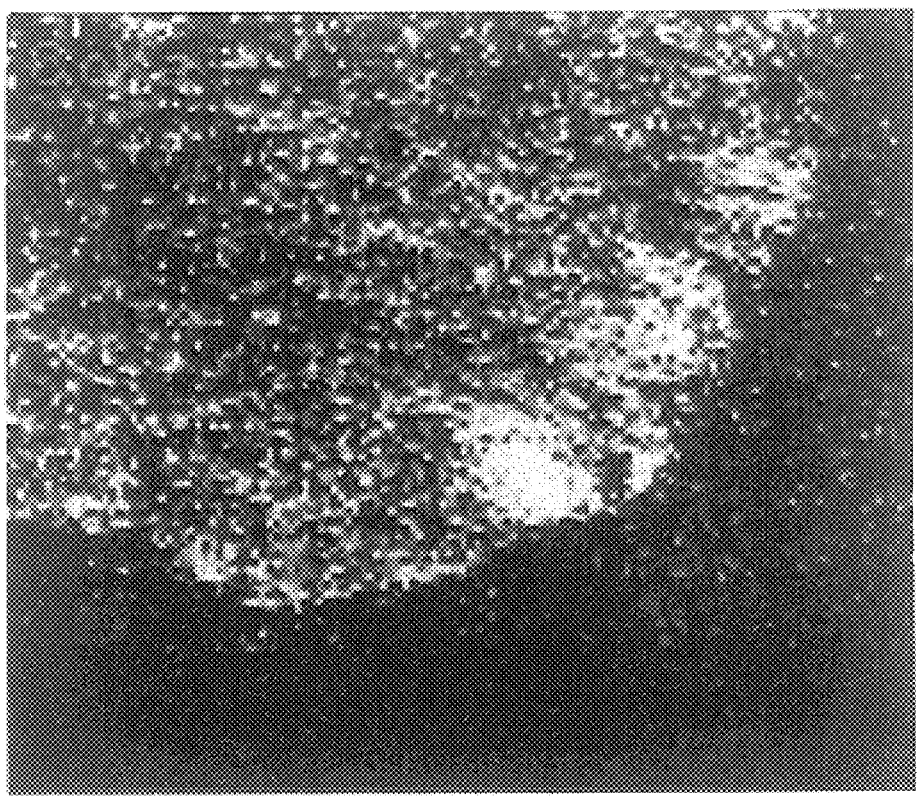
FIG. 4 is a 19500× magnification SEM photograph of a nickel hydroxide particle that contains sorbed cobalt illustrating cobalt distribution.

Contacting nickel hydroxide (4.8% Zn) with a 1 molar acetate solution containing 18.8 g/L of cobalt and ammonia (approximately 3 molar) initiated the reaction. The pH of the solution maintained at 50° C. was 9.1. Following 24 hours of contact, a solid/liquid separation step recovered the hydroxide. The solution analyzed 16.5 g/L cobalt and 2.73 g/L nickel and the resulting hydroxide analyzed 0.95% cobalt. Referring to FIG. 4, the sorbed cobalt distributed quite uniformly throughout the particles.

The electrochemical performance of the hydroxide resulting this Example increased significantly over that of the starting material.

Although the process solution employed in the above Examples rely on the acetate anion from ammonium acetate, the viability of this process does not rely solely on this particular anion. Any system, such as sulfate, chloride, nitrate, phosphate, mono-carboxylates or poly-carboxylates or any combinations of such ammonium salts operate with the process of the invention. Furthermore, it is possible for the reaction to proceed with an anion-free solution.

This process operates either on a continuous or batch basis. When operating under steady-state conditions, the solution simultaneously dissolves the metal powders and precipitates the hydroxide. It is essential that nickel powder be substantially-free of oxide coating to initiate the dissolution process. Placing the powder in the ammoniacal process liquor removes any oxide film to initiate the reaction. Optionally, it is possible to activate the powder by first rinsing it in the presence of a strong acid. Dissolving the activated powders in the presence of oxygen at a negative or reducing potential drives the reaction. If the rate of oxygen addition exceeds the reaction rate, the redox potential become positive and the reaction ceases. Advantageously, redox potential remains below at least –100 mV as measured with a standard Calomel electrode for driving the reaction at a reasonable rate. Increasing the surface area of the additive particles or powders increases the dissolution rate of these powders to further lower the redox potential. Most advantageously, a redox potential between –250 mV and –700 mV drives the reaction.

Since the process of the invention operates with multiple metallic powders, it is important to use metals with sufficiently high dissolution rates in ammonia solution. Generally, decreasing powder size or increasing a powder's surface area increases the reaction rate. Most advantageously, the additive has an average particle size of less than 10 $\mu$m for rapid dissolution into the solution. When adding multiple additives to a nickel hydroxide, it is important to balance the quantity and reactivity of the powder to achieve the desired result.

This reaction relies upon a basic ammonia-containing solution to dissolve the additives at a rapid rate. A pH between 9 and 12 produces the best results. Furthermore, to prevent the particles from becoming over-crystalline, the reaction advantageously operates at a temperature below 90° C. Most advantageously, the reaction proceeds at a temperature between 20° C. and 80° C. to leave an amorphous crystal structure.

Although it is possible to both dope and coat the nickel hydroxide with a blend of several additives, it is important not to introduce unnecessary additives in the system. Initial testing indicates that doping the nickel hydroxide with less than 5 weight percent zinc stabilizes the nickel hydroxide and prevents formation of gamma phase nickel hydroxide. This stability decreases the volumetric expansion and contraction associated with the charge discharge cycles of a battery to increase the battery's life.

Similarly, coating the nickel hydroxide with a conductive hydroxide, such as cobalt hydroxide, also increases battery performance. Doping nickel hydroxide's core regions with 0.3 to 10 weight percent additive and its exterior regions with 10 to 50 weight percent additive most efficiently utilizes additives. Most advantageously, the core contains 0.6 to 5 weight percent additive and the exterior contains 20 to 40 weight percent additive. Doping the nickel hydroxide's exterior regions with at least 20 weight percent additive can dramatically increase the surface conductivity of the nickel hydroxide. A coating containing at least 80 weight percent cobalt provides excellent conductivity. For maximum conductivity, the coating contains essentially pure cobalt hydroxide. Optionally, it is possible to dope the cobalt coating with up to 10 weight percent zinc or other additive.

In accordance with the provisions of the statute, this specification illustrates and describes specific embodiments of the invention. Those skilled in the art will understand that the claims cover changes in the form of the invention and that certain features of the invention may operate advantageously without a corresponding use of the other features.

We claim:

1. A process for precipitating additives with nickel hydroxide comprising the steps of:
   a) providing an aqueous ammonia solution containing nickel hydroxide seeds;
   b) introducing at least one metallic additive into said aqueous solution to create an aqueous slurry having a reducing potential, said additive being selected from the group consisting of aluminum, cadmium, cobalt, indium, iron, manganese and zinc;
   c) introducing oxygen into said aqueous slurry at a rate that maintains said reducing potential of said aqueous slurry; and
   d) dissolving said at least one additive into said aqueous solution in excess of the solubility limit of said aqueous solution to precipitate the additive in the form of a hydroxide on said nickel hydroxide seeds.

2. The process of claim 1 including the additional step of introducing nickel particles into said aqueous solution and said nickel dissolves into said aqueous solution to coprecipitate nickel hydroxide with said hydroxide of said additive.

3. The process of claim 2 including the additional step of recycling said coprecipitated nickel hydroxide to supply said nickel hydroxide seeds to step a).

4. The process of claim 1 wherein said dissolving of said at least one additive dopes core regions of said nickel hydroxide seeds with 0.3 to 10 weight percent additive and exterior regions of said nickel hydroxide seeds with 10 to 50 weight percent additive.

5. The process of claim 4 wherein said dissolving of said at least one additive dopes said nickel hydroxide seeds with cobalt.

6. A process for precipitating additives with nickel hydroxide comprising the steps of:
   a) providing an aqueous ammonia solution containing nickel hydroxide seeds;
   b) introducing at least one metallic additive into said aqueous solution to create an aqueous slurry having a reducing potential below $-100$ mV as measured with a standard Calomel electrode, said additive being selected from the group consisting of aluminum, cadmium, cobalt, indium, iron, manganese and zinc;
   c) introducing oxygen into said aqueous slurry at a rate that maintains said reducing potential below said $-100$ mV of said aqueous slurry; and
   d) dissolving said at least one additive into said aqueous solution in excess of the solubility limit of said aqueous solution to precipitate the additive in the form of a hydroxide on said nickel hydroxide seeds at a temperature below 100° C. to produce an additive-containing nickel hydroxide.

7. The process of claim 6 including the additional step of introducing nickel particles into said aqueous solution and said nickel dissolves into said aqueous solution to coprecipitate nickel hydroxide with said hydroxide of said additive.

8. The process of claim 7 including the additional step of recycling said coprecipitated nickel hydroxide to supply said nickel hydroxide seeds to step a).

9. The process of claim 6 wherein said dissolving of said at least one additive dopes core regions of said nickel hydroxide seeds with 0.3 to 10 weight percent additive and exterior regions of said nickel hydroxide seeds with 10 to 50 weight percent additive.

10. The process of claim 6 wherein said aqueous ammonia solution is derived from an ammonium salt selected from the group consisting of sulfate, chloride, nitrate, phosphate, mono-carboxylates or poly-carboxylates.

11. The process of claim 6 including the additional step of sorbing cobalt into said additive-containing nickel hydroxide.

12. A process for precipitating additives with nickel hydroxide comprising the steps of:
   a) providing an aqueous ammonia solution containing nickel hydroxide seeds;
   b) introducing metallic cobalt into said aqueous solution to create an aqueous slurry having a reducing potential below $-100$ mV as measured with a standard Calomel electrode;
   c) introducing oxygen into said aqueous slurry at a rate that maintains said reducing potential below said $-100$ mV of said aqueous slurry; and
   d) dissolving said metallic cobalt into said aqueous solution in excess of the solubility limit of said aqueous solution to precipitate cobalt in the form of cobalt hydroxide on said nickel hydroxide seeds at a temperature below 100° C.

13. The process of claim 12 including the additional step of introducing nickel particles into said aqueous solution and said nickel dissolves into said aqueous solution to coprecipitate nickel hydroxide with said cobalt hydroxide.

14. The process of claim 12 including the additional step of recycling said coprecipitated nickel hydroxide to supply said nickel hydroxide seeds to step a).

15. The process of claim 12 wherein said dissolving of said metallic cobalt dopes core regions of said nickel hydroxide seeds with 0.6 to 5 weight percent additive and exterior regions of said nickel hydroxide seeds with 20 to 40 weight percent cobalt.

16. The process of claim 15 wherein said dissolving of said metallic cobalt dopes said nickel hydroxide with cobalt.

17. The process of claim 12 wherein said precipitating deposits said cobalt hydroxide coating on seeds doped with zinc.

18. The process of claim 12 wherein said aqueous ammonia solution is derived from an ammonium salt selected from the group consisting of sulfate, chloride, nitrate, phosphate, mono-carboxylates or poly-carboxylates.

* * * * *